US008911115B2

(12) United States Patent
Ogawa et al.

(10) Patent No.: US 8,911,115 B2
(45) Date of Patent: Dec. 16, 2014

(54) IRRADIATION DEVICE

(71) Applicant: Iwasaki Electric Co., Ltd., Tokyo (JP)

(72) Inventors: Daisuke Ogawa, Gyoda (JP); Kentarou Oohashi, Gyoda (JP); Kazuyoshi Yamada, Gyoda (JP); Katsumi Kimura, Gyoda (JP)

(73) Assignee: Iwasaki Electric Co., Ltd., Tokyo (JP)

( * ) Notice: Subject to any disclaimer, the term of this patent is extended or adjusted under 35 U.S.C. 154(b) by 76 days.

(21) Appl. No.: 13/672,812

(22) Filed: Nov. 9, 2012

(65) Prior Publication Data

US 2013/0114264 A1 May 9, 2013

(30) Foreign Application Priority Data

Nov. 9, 2011 (JP) ................. 2011-245909

(51) Int. Cl.
*F21V 9/00* (2006.01)
*F21S 8/00* (2006.01)
*G02B 5/20* (2006.01)
*G02B 5/28* (2006.01)
*G02B 27/00* (2006.01)
*G01J 1/08* (2006.01)

(52) U.S. Cl.
CPC . *F21V 9/00* (2013.01); *F21S 8/006* (2013.01); *G02B 5/205* (2013.01); *G02B 5/28* (2013.01); *G02B 27/0018* (2013.01); *G01J 1/08* (2013.01)

USPC ................. 362/293; 362/2; 362/583

(58) Field of Classification Search
CPC ....... G01N 21/64; G01N 21/59; G01N 21/65; G01J 3/23; G01J 3/02; G01J 3/0291; G01J 3/32; G01J 3/44
USPC ........... 362/2, 293, 583; 356/317, 301, 243.8, 356/416, 323; 250/372, 458.1, 226; 347/241, 256; 359/589
See application file for complete search history.

(56) References Cited

U.S. PATENT DOCUMENTS

| 2006/0023056 | A1* | 2/2006 | Suzuki et al. ................. 347/134 |
| 2009/0002673 | A1* | 1/2009 | Shinoda ......................... 355/71 |
| 2009/0002702 | A1* | 1/2009 | Maier et al. .................... 356/301 |
| 2010/0034743 | A1* | 2/2010 | Cohen et al. .................. 424/9.1 |

FOREIGN PATENT DOCUMENTS

JP   2009-218009 A   9/2009
JP   2009-264991 A   11/2009

* cited by examiner

*Primary Examiner* — Anh Mai
*Assistant Examiner* — Kevin Quarterman
(74) *Attorney, Agent, or Firm* — Westerman, Hattori, Daniels & Adrian, LLP

(57) ABSTRACT

One spectrum correction filter that changes a spectral characteristic of emission light from the light source, at least one neutral density filter disposed on the same optical axis of the spectrum correction filter, wherein the at least one spectrum correction filter and/or the at least one neutral density filter is tilted so that a travel direction of reflection light reflected from the at least one spectrum correction filter is deviated from the optical axis.

9 Claims, 8 Drawing Sheets

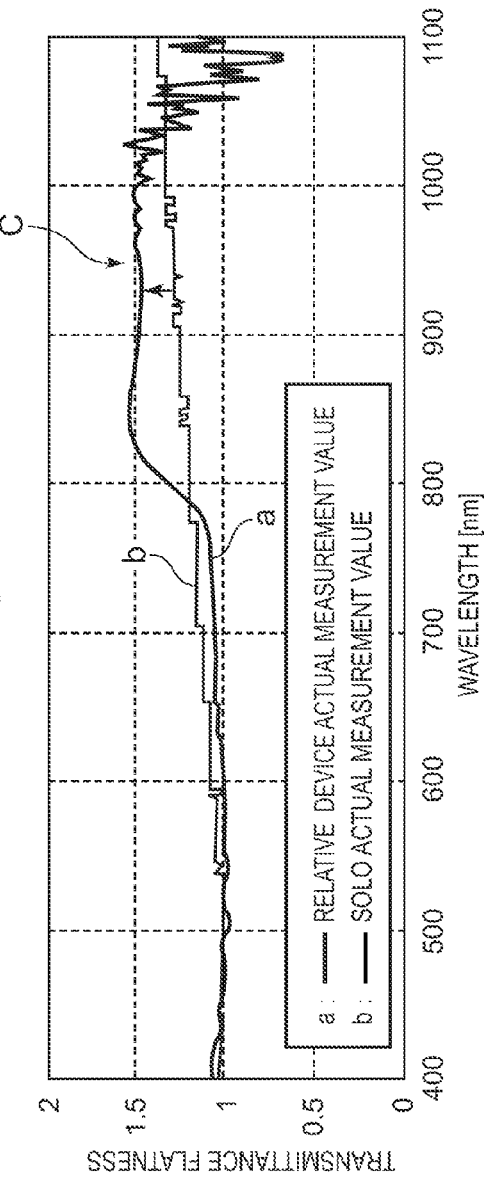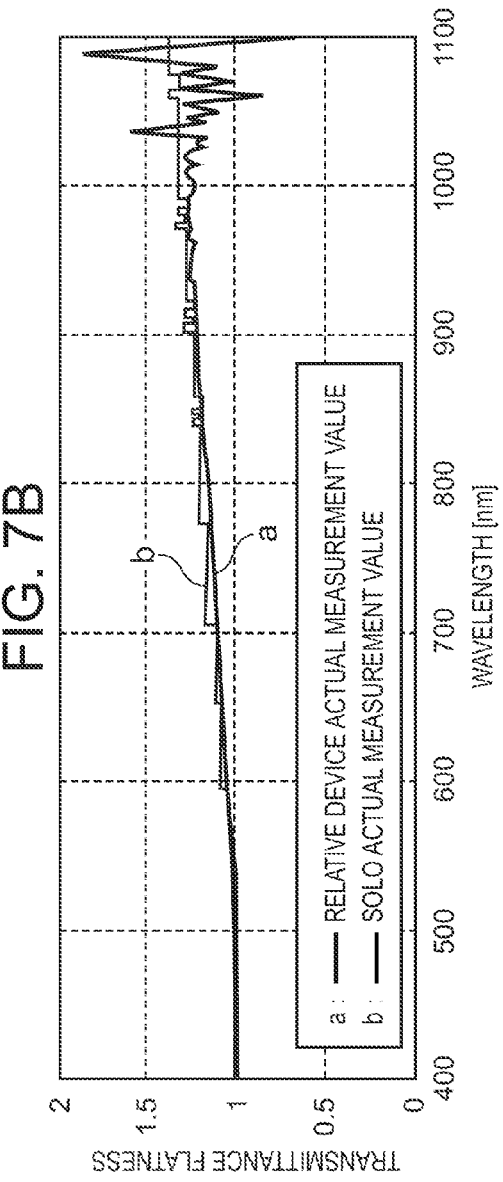

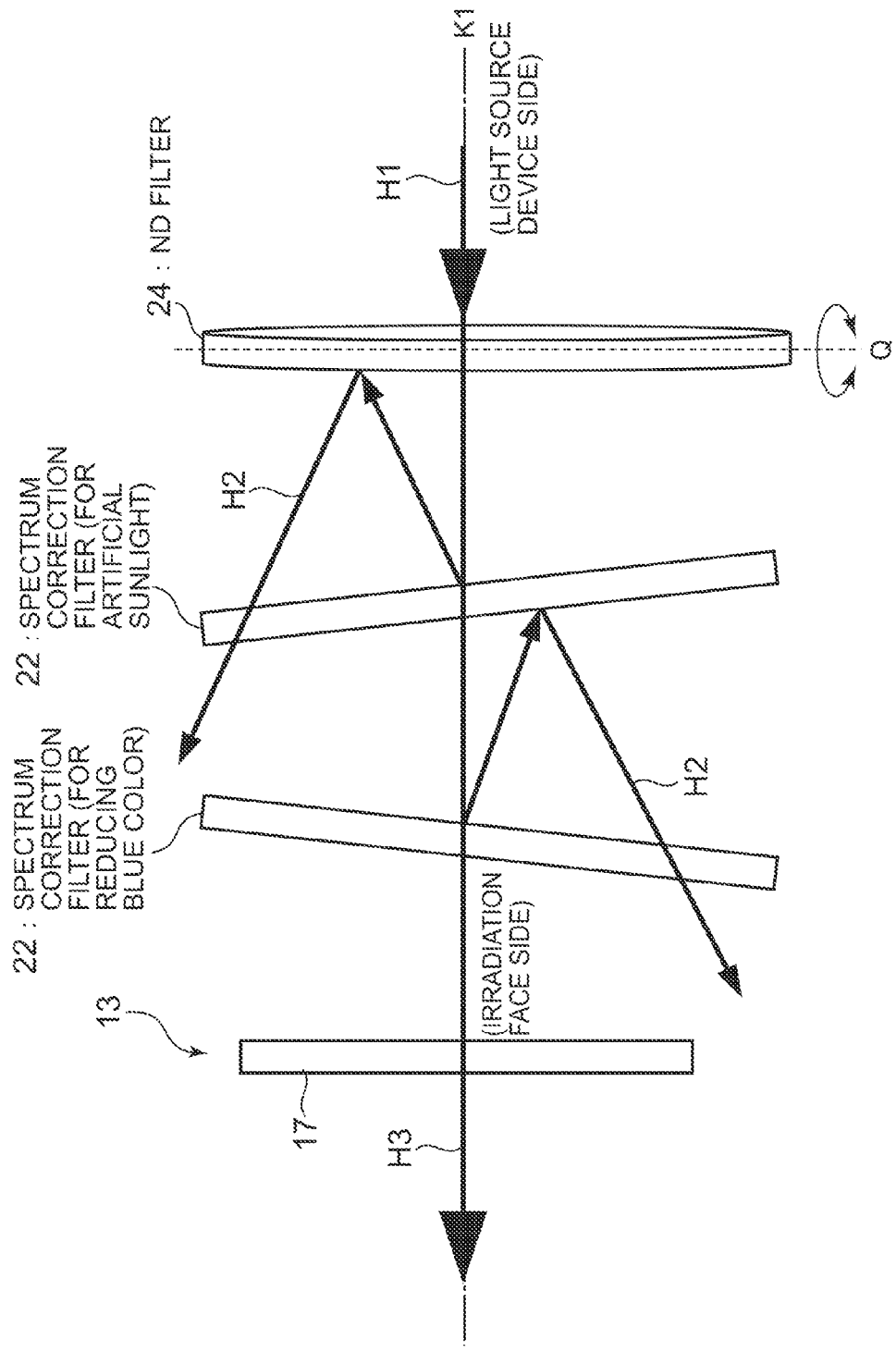

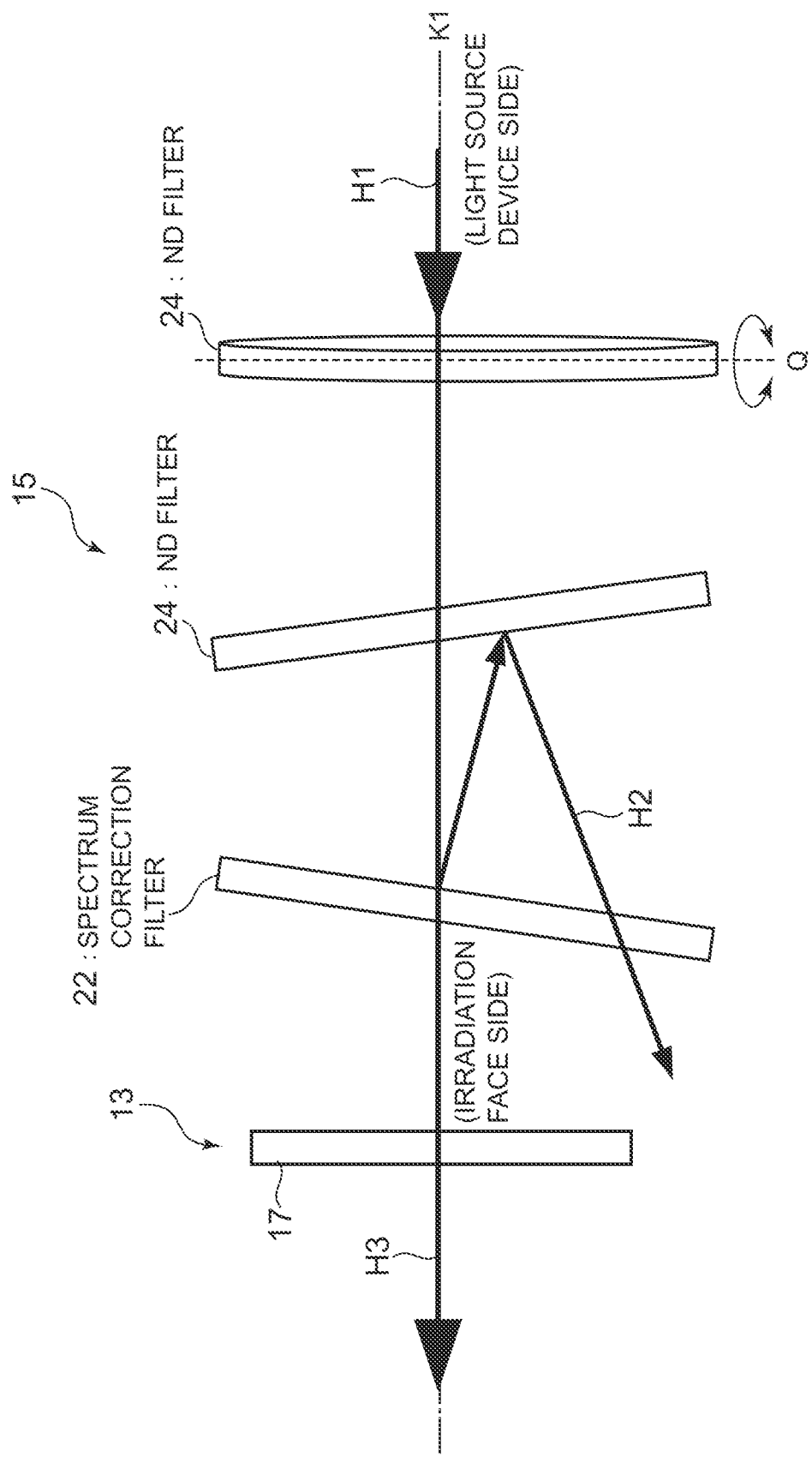

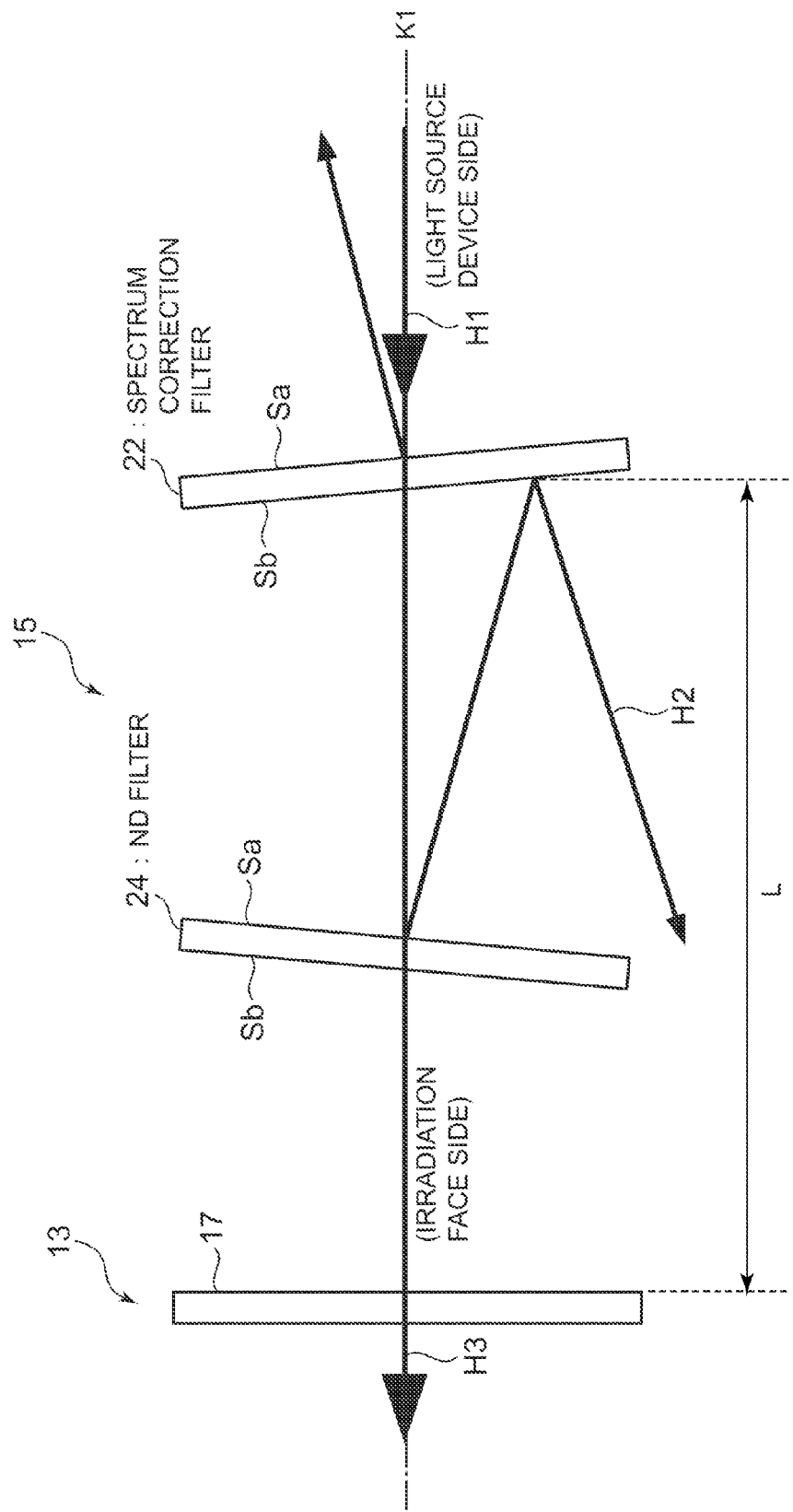

IRRADIATION DEVICE

INCORPORATION BY REFERENCE

The present application claims priority under 35 U.S.C. §119 to Japanese Patent Application No. 2011-245909 filed on Nov. 9, 2011. The content of the application is incorporated herein by reference in its entirety.

BACKGROUND OF THE INVENTION

1. Field of the Invention

The present invention relates to an irradiation device that is suitably used for characteristic evaluation, light resistance test (e.g., fading test or the like) or the like for a device such as a solar cell or the like.

2. Background of the Related Art

An artificial (pseudo) sunlight irradiation device for emitting light having substantially the same spectral characteristic as sunlight (hereinafter referred to as "artificial sunlight") has been hitherto known, and broadly used for characteristic evaluation, light resistance tests (fading tests), etc. for solar cells (see JP-A-2009-2649912 and JP-A-2009-218009, for example).

The applicant (inventor) has filed an international application (PCT/JP2011/066531) for an artificial sunlight irradiation device in which a spectrum correction filter for converting the spectral characteristic of a light source to the spectral characteristic of sunlight and a light attenuating filter such as a neutral density filter (ND filter) for adjusting the amount of light are freely exchangeably provided on an optical path extending from the light source to an irradiation face so that the spectral characteristic of the artificial sunlight and the light amount thereof can be easily adjusted.

When the spectrum correction filter and the neutral density filter are provided on the optical path, reflection light reflected from a film face coated on one of the filters is reflected from a film face on the other filter and mixed with irradiation light to the irradiation face. When this reflection light is based on reflection from the film face of the spectrum correction filter, the spectral characteristic is modulated due to the reflection at the spectrum correction filter. Accordingly, when the reflection light as described above is mixed with the irradiation light, the spectral characteristic of the irradiation light is deviated from a desired design value. Therefore, there is a problem that it is impossible to obtain irradiation light whose quality is matched with characteristic evaluation and the purpose of light resistance tests.

SUMMARY OF THE INVENTION

The present invention has been implemented in view of the foregoing situation, and has an object to provide an irradiation device that can suppress deviation of a spectral characteristic caused by mixture of reflection light from a spectrum correction filter.

In order to attain the object, there is provided an irradiation device comprising: a light source; at least one spectrum correction filter that changes a spectral characteristic of emission light from the light source; at least one neutral density filter disposed on the same optical axis of the spectrum correction filter, wherein at least either the at least one spectrum correction filter or the at least one neutral density filter is tilted so that a travel direction of reflection light reflected from the at least one spectrum correction filter is deviated from the optical axis.

In the above irradiation device, each of the at least one spectrum correction filter and the at least one neutral density filter may be tilted in opposite directions with respect to the optical axis.

In the above irradiation device, the tile angle of each of the at least one spectrum correction filter and the at least one neutral density filter with respect to the optical axis may be set in a range from 5° to 30° so as to reduce variation of a transmission spectral characteristic thereof caused by oblique light incidence.

In the above irradiation device, the at least one spectrum correction filter and the at least one neutral density filter may be successively arranged from the light source side in a transmittance increasing order so that a filter having lower transmittance out of the at least one spectrum correction filter and the at least one neutral density filter is nearer to the light source.

In the above irradiation device, a filter having lowest transmittance among the at least one spectrum correction filter and the at least one neutral density filter may be disposed at an incidence side of the emission light from the light source.

In the above irradiation device, the spectrum correction filter may have a spectral characteristic of attenuating or cutting off light in an infrared wavelength band, and may be disposed to be nearer to an incidence side of the emission light from the light source than the neutral density filter.

In the irradiation device, the tilt directions of the at least one spectrum correction filter and the at least one neutral density filter may be set to be different from each other, for example, substantially perpendicular to each other.

According to this invention, at least one of the spectrum correction filter and the neutral density filter (ND filter) is arranged to be tilted so that reflection light reflected at the spectrum correction filter is deviated from the optical axis. Therefore, mixture of reflection light with irradiation light can be suppressed, and thus the deviation of the spectral characteristic of the irradiation light from a desired design characteristic can be suppressed.

BRIEF DESCRIPTION OF THE DRAWINGS

FIGS. 7A and 7B are diagrams showing flatness of the transmittance of the ND filter, wherein FIG. 7A shows the transmittance flatness of the reference construction shown in FIG. 6, and FIG. 7B shows the transmittance flatness of the construction of the embodiment according to the present invention;

FIG. 8 is a diagram showing the construction of a modification of the optical filter group according to the present invention;

FIG. 9 is a diagram showing the construction of a modification of the optical filter group according to the present invention; and FIG. 10 is a diagram showing the construction of a modification of the optical filter group according to the present invention.

DETAILED DESCRIPTION OF THE EMBODIMENT

An embodiment according to the present invention will be described with reference to the drawings. In this embodiment, an artificial (pseudo) sunlight irradiation device used for characteristic evaluation, a light resistance test (e.g., a fading test) or the like for a device such as s solar cell or the like will be described as an embodiment of an irradiation device according to the present invention.

Figure 1:
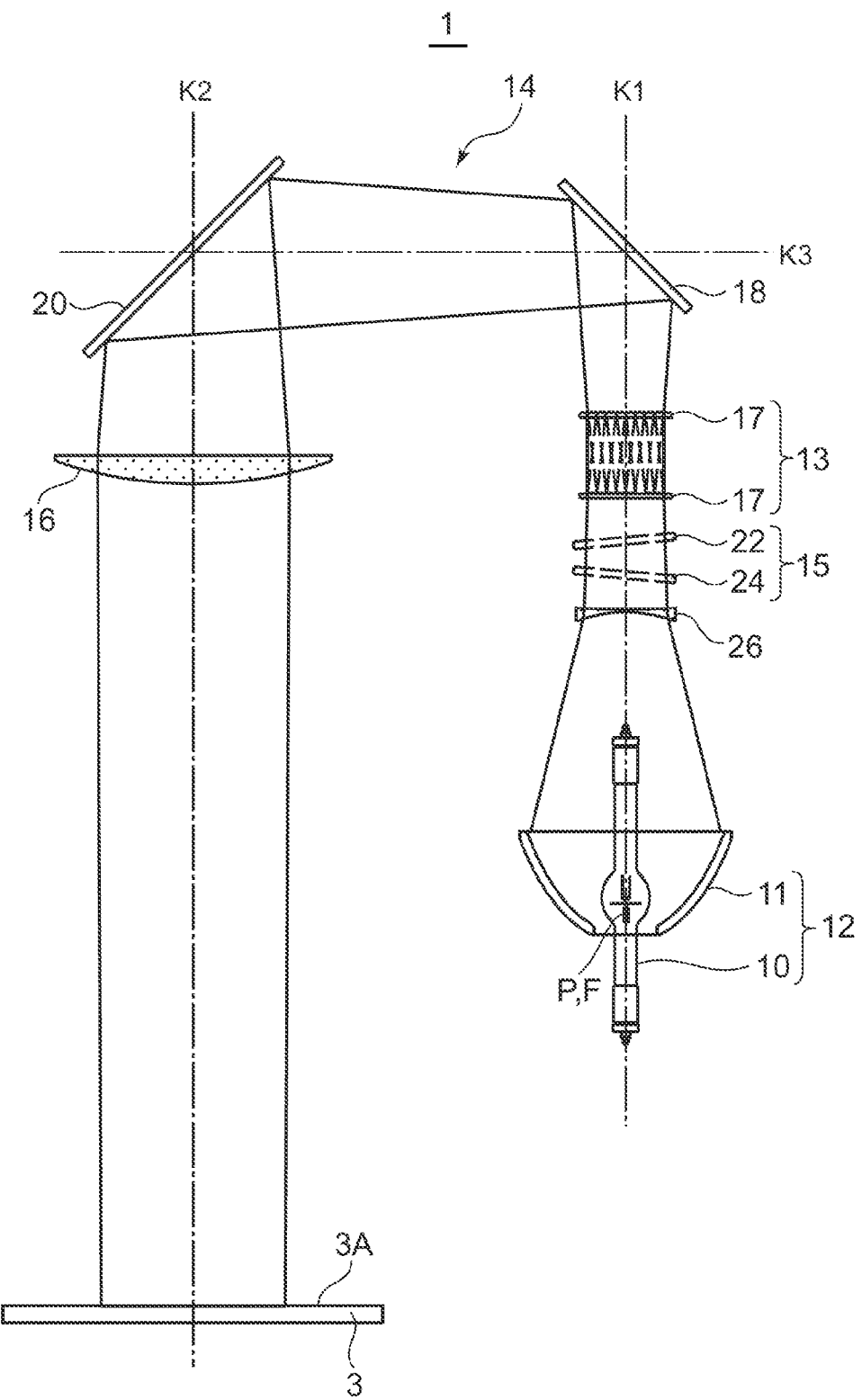
FIG. 1 is a diagram showing the construction of an artificial (pseudo) sunlight irradiation device according to an embodiment of the present invention.

FIG. 1 is a diagram showing the construction of an artificial (pseudo) sunlight irradiation device 1 according to the present invention.

As shown in FIG. 1, the artificial sunlight irradiation device 1 has a sample mount stage 3 on which a sample as a characteristic evaluation target or a light resistance test (fading test) target is mounted, a light source device 12, a transmission type integrator optical system 13 to which irradiation light of the light source device 12 is incident, a collimation optical system 14 that collimates light passing through the transmission type integrator optical system 13 and irradiates the sample mount stage 3 with the collimated light, and an optical filter group 15.

The light source device 12 has a lamp 10 as a light source, and an elliptical reflection mirror 11 as a condensing reflection mirror for condensing light emitted from the lamp 10.

A short arc lamp which has a high optical system efficiency and is close to a point light source is used as the lamp 10 to implement high output power of artificial (pseudo) sunlight. The lamp 10 is required to emit light whose wavelength band satisfies requirements based on the contents of tests or evaluation and have a broad spectral characteristic in the wavelength band concerned, and for example, a xenon lamp or a halogen lamp is preferably used as the lamp 10. In this embodiment, the xenon lamp is used.

The elliptical reflection mirror 11 is disposed so that the optical axis K1 is directed upwards vertically, and the lamp 10 is inserted and disposed in the elliptical reflection mirror 11 so as to be vertically erected coaxially with the optical axis K1 of the elliptical reflection mirror 11.

Furthermore, the optical source device 12 is provided with a position adjusting mechanism (not shown) for relatively moving the lamp 10 or the elliptical reflection mirror 11 in the direction of the optical axis K1 and the direction vertical to the optical axis K1 so as to make the light emission point P of the lamp 10 coincident with the focal point f of the elliptical reflection mirror 11. The lamp 10 is air-cooled by an air blowing fan (not shown) to stabilize the light emission of the lamp 10.

The transmission type integrator optical system 13 is an optical system for compensating for offsetting uneven irradiation and uneven color of light emitted from the light source device 12, and it is constructed by two fly-eye lens 17 arranged on the optical axis K1. A rod integrator may be disposed on the optical axis K1 in place of the fly-eye lens 17.

The collimation optical system 14 collimates light passing through the transmission type integrator optical system 13, and guides the light to the irradiation face 3A. The collimation optical system 14 has a collimation lens 16 and two reflection flat mirrors 18 and 20. The two reflection flat mirrors 18 and 20 make light passing through the transmission type integrator optical system 13 incident to the collimator lens 16, and the collimator lens 16 collimates and emits the incident light.

The collimator lens 16 is disposed so as to confront the sample mount stage 3 so that the optical axis K2 is substantially vertical to the irradiation face 3A of the sample mount stage 3, and the collimated light from the collimator lens 16 is incident substantially vertically to the irradiation face 3A of the sample mount stage 3 to irradiate the irradiation face 3A with the light having uniform illuminance (intensity of illumination).

In this embodiment, the optical axis K1 of the light source device 12 and the transmission type integrator optical system 13 and the optical axis K2 of the collimator lens 16 are arranged substantially in parallel to each other. The light passing through the transmission type integrator optical system 13 is reflected by one reflection flat mirror 18 to be deflected by about 90°, and then reflected by the other reflection flat mirror 20 so as to be incident to the collimator lens 16 along the optical axis K2, whereby an optical path extending from the light source device 12 to the irradiation face 3A is constructed substantially in inverted U-shape.

The optical filter group 15 is disposed at the incident side of the fly-eye lens 17 to convert the spectral characteristic of light emitted from the light source device 1 to a predetermined spectral characteristic required for characteristic evaluation and light resistance test (fading test or the like) for a device and adjust the amount of the light. The optical filter group 15 is constructed by only transmission type optical filters. In this embodiment, the optical filter group 15 has a spectrum correction filter 22 and an ND (Neutral Density) filter 24, and they are successively disposed on the same optical axis K1 of the light source device 12 in this order.

The spectrum correction filter 22 is a transmission type optical filter for converting the spectral characteristic of transmission light to the spectral characteristic of artificial (pseudo) sunlight. The ND filter 24 is a transmission optical filter which is also called as a neutral density filter and reduce the light amount of the transmission light.

The spectrum correction filter 22 and the ND filter 24 are provided on the optical axis K1 so as to be freely exchangeable by other ones. The spectrum characteristic of the irradiation light and the light amount of the irradiation light can be freely changed by exchanging these filters. A relay lens 26 is disposed on the optical axis K1 between the light source device 12 and the optical filter group 15.

Figure 2:
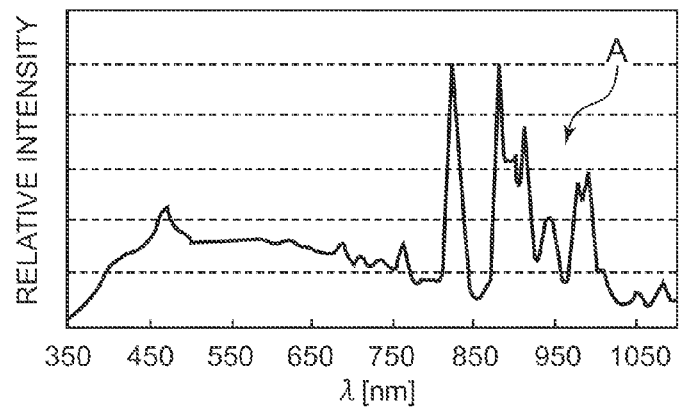
FIG. 2 is a diagram showing an emission spectrum characteristic of a light source device.
Figure 3:
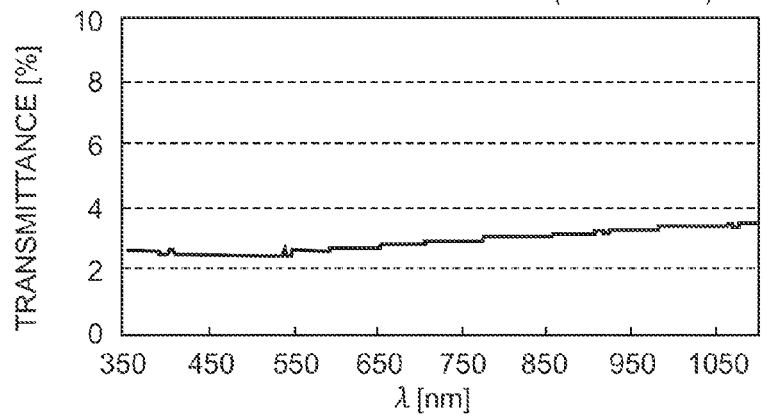
FIG. 3 is a diagram showing a transmission spectral characteristic of an ND filter.
Figure 4:
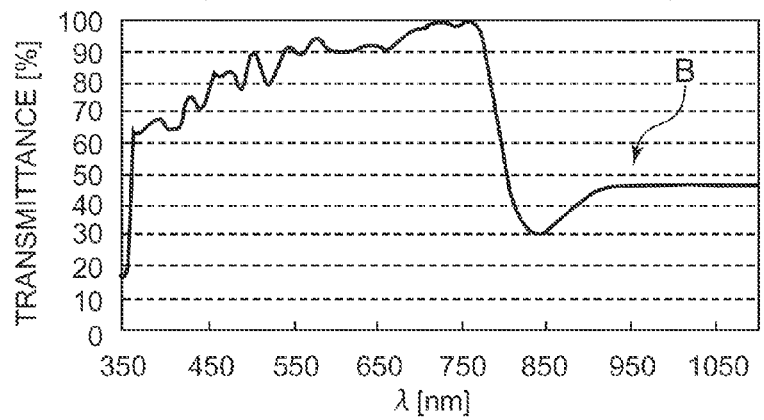
FIG. 4 is a diagram showing a transmission spectral characteristic of a spectrum correction filter.

FIG. 2 is a diagram showing the emission spectral characteristic of the light source device 12, and FIG. 3 is a the transmission spectral characteristic of the ND filter 24. FIG. 4 is a diagram showing the transmission spectral characteristic of the spectrum correction filter 22.

A xenon lamp used as the lamp 10 of the light source device 12 emits light in a broad wavelength range from an ultraviolet band to an infrared band as shown in FIG. 2, but light components in the infrared band (indicated by an arrow A in FIG. 2) are remarkably higher in relative intensity than light components in the other wavelength band.

On the other hand, as shown in FIG. 4, the transmission spectral characteristic of the spectrum correction filter 22 is set so that the transmittance thereof is relatively lower in the infrared band (indicated by an arrow B in FIG. 4) so as to suppress the light components of the infrared band of the emission light of the light source device 12. The light emitted from the light source device 12 is transmitted through the spectrum correction filter 22 described above, thereby obtaining artificial (pseudo) sunlight ranging from the ultraviolet band to the infrared band.

Furthermore, in order to reduce only the light amount without varying the spectral characteristic of transmitted light, the transmission spectral characteristic of the ND filter 24 is set to have such a flat transmission characteristic that the transmittance thereof is substantially constant in the range from the ultraviolet band to the infrared band as shown in FIG. 3.

Figure 5:
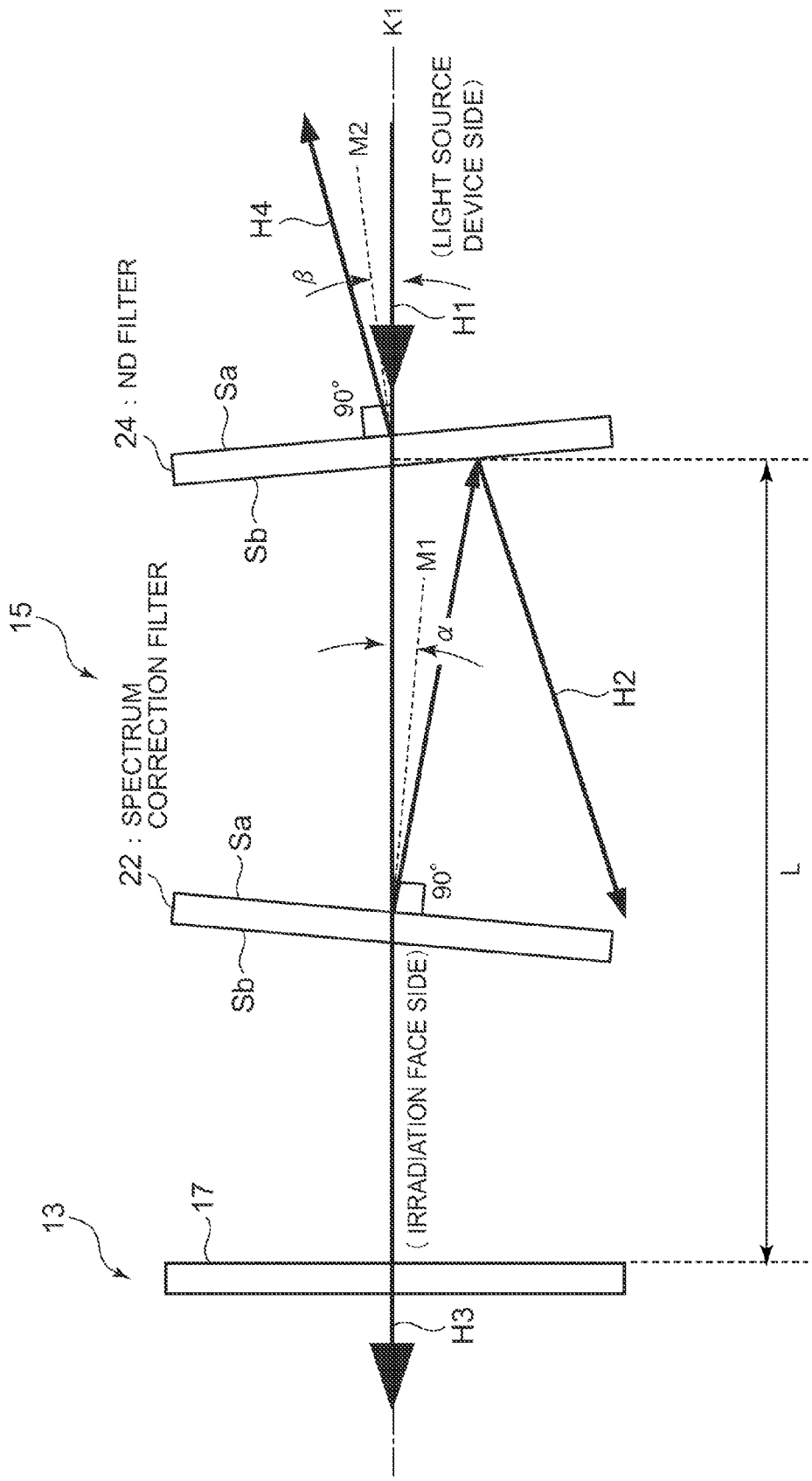
FIG. 5 is an enlarged diagram showing an optical filter group.

FIG. 5 is an enlarged diagram of the optical filter group 15.

In this embodiment, the spectrum correction filter 22 and the ND filter 24 constituting the optical filter group 15 are disposed so that the incidence surfaces Sa (emission surfaces Sb) thereof are not vertical to the optical axis K1, but tilted with respect to the optical axis K1 by predetermined tilt angles α, β, respectively.

Figure 6:
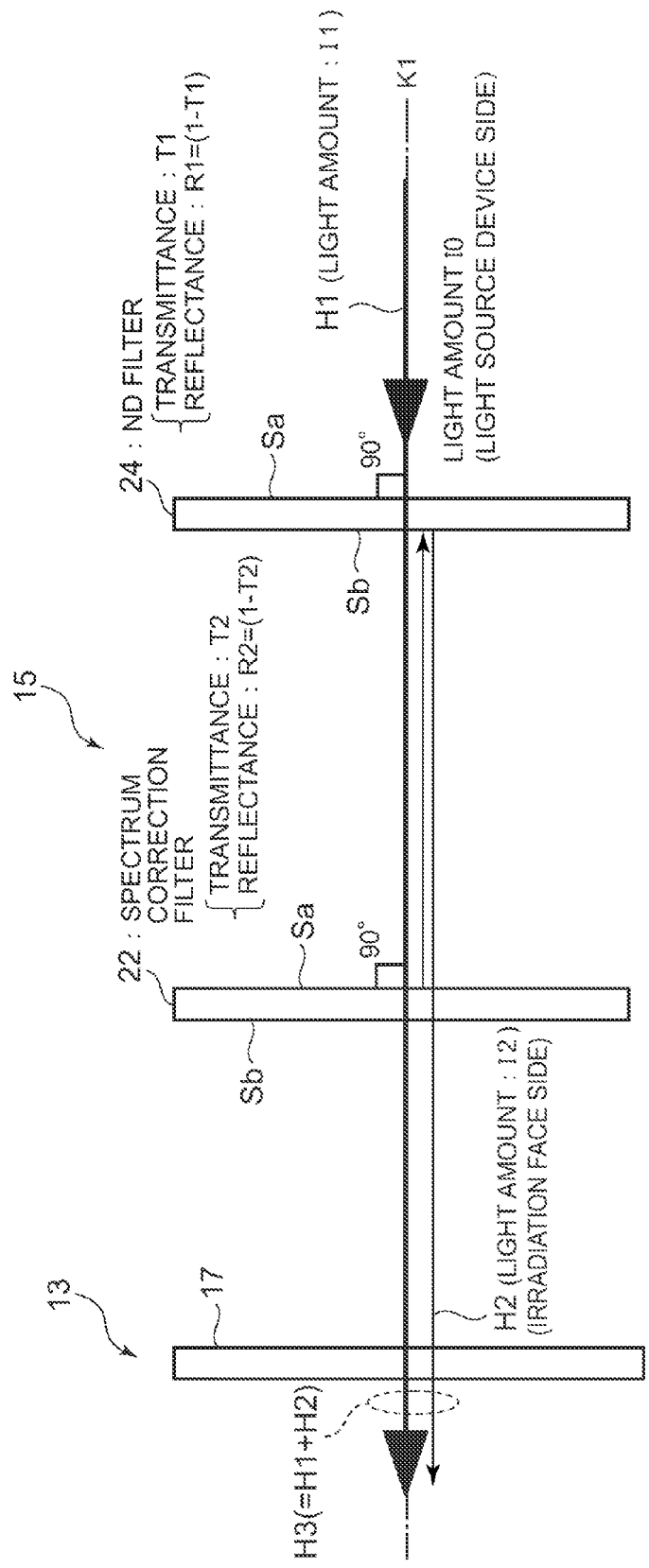
FIG. 6 is a diagram showing a reference construction of the optical filter group for the present invention.

Specifically, with respect to the spectrum correction filter 22, light reflection is occurs in no small way in connection with light incidence to the incidence surface Sa and the emission surface Sb. Accordingly, for example, in a case where the spectrum correction filter 22 is disposed at the irradiation face 3A side, the ND filter 24 is disposed at the light source device 12 side and each of the spectrum correction filter 22 and the ND filter 24 is disposed to be vertical (90°) to the optical axis K1 as shown in FIG. 6, when emission light H1 from the light source device 12 is incident to the incidence surface Sa of the spectrum correction filter 22, many back-side reflections would occur if the incidence surface Sa is a coated film face. When the incidence surface Sa of the spectrum correction filter 22 and the emission surface Sb of the ND filter 24 are formed of film faces, multiple reflection occurs between the emission surface Sb of the ND filter 24 and the incidence surface Sa of the spectrum correction filter 22 (only reflection light component caused by one reflection is shown in FIG. 6) due to the above back-surface reflection. Reflection light H2 which occurs due to the multiple reflection (containing one reflection) as described above is transmitted through the spectrum correction filter 22, and mixed with the emission light H1, so that the mixture light is incident to the fly-eye lens 17 as irradiation light H3.

The reflection light H2 is subjected to the spectral modulation corresponding to the transmission spectral characteristic every time the light is reflected from the incidence surface Sa of the spectrum correction filter 22, and thus the transmission spectral characteristic of the spectrum correction filter 22 is relatively lower in transmittance in the infrared band as shown in FIG. 4. Accordingly, the intensity of the reflection light H2 in the infrared band is relatively higher conversely to the transmission spectral characteristic of the spectrum correction filter 22. As a result, with respect to the spectral characteristic of the irradiation light H3, the intensity of the reflection light H3 in the infrared band is also relatively higher than that in the other wavelength bands due to the effect of the reflection light H2, and it is deviated from a design value.

The mixing rate of the reflection light H2 to the emission light H1 is calculated on the basis of the transmittance of the spectrum correction filter 22 and the transmittance of the ND filter 24.

When the transmittance of the ND filter 24 and the transmittance of the spectrum correction filter 22 are represented by T1 and T2 respectively, the reflectance of the ND filter 24 and the reflectance of the spectrum correction filter 22 are represented by R1 and R2 and the light amount of the emission light from the light source device 12 is represented by I0, the light amount I1 of the emission light H1 which passes through the spectrum correction filter 22 and is incident to the fly-eye lens 17 is represented according to the following formula (1).

The light amount $I1$ of the emission light $H1 = I0 \times T1 \times T2$ \hfill (1)

The light amount I2 of the reflection light H2 which is transmitted through the spectrum correction filter 22 and incident to the fly-eye lens 17 after subjected to multiple reflection between the spectrum correction filter 22 and the ND filter 24 is represented by the following formula (2) when the reflection frequency is once.

The light amount $I2$ of the reflection light $H2 = I0 \times T1 \times R2 \times R1 \times T2$ \hfill (2)

Accordingly, the mixing rate of the reflection light H2 to the emission light H1 is calculated by the following formula (3) on the basis of the formula (1) and the formula (2).

The mixing rate of the reflection light $H2$ to the irradiation light \hfill (3)

$$H3 = \frac{\text{(the light amount } I2 \text{ of the reflection light } H2)}{\text{(the light amount } I1 \text{ of the emission light } H1)} = R1 \times R2 = (1 - T1) \times (1 - T2)$$

Here, it is assumed that light absorption is equal to "0" in both the spectrum correction filter 22 and the ND filter 24.

As represented by the formula (3), it is found that the mixing rate increases and the effect of the reflection light H2 intensifies as the transmittances T1 and T2 of the spectrum correction filter 22 and the ND filter 24 are lower.

Particularly, in the characteristic evaluation or the light resistance test, the evaluation or the like is executed while the spectrum correction filter 22 is fixed and the ND filter 24 is arbitrarily exchanged or added to adjust the light amount of the irradiation light H3 in a multiple-step form. In such a case, the spectral characteristic of the irradiation light H3 varies in accordance with the mixing rate of the reflection light H2 every time the ND filter 24 is exchanged or added, and the variation of the spectral characteristic of the irradiation light H3 is more remarkable as the light amount decreases more greatly by reducing the transmittance T1 of the ND filter 24. When the spectral characteristic of the irradiation light H3 varies every time the transmittance T1 of the ND filter 24 is changed to vary the light amount as described above, the reliability of data obtained by the evaluation or the like degrades.

Therefore, according to this embodiment, the spectrum correction filter 22 and/or the ND filter 24 are disposed to be tilted (inclined) with respect to the optical axis K1 so that the reflection light H2 occurring between the spectrum correction filter 22 and the ND filter 24 travels in a different direction from the irradiation light H1, that is, in a direction deviated from the optical axis K1 as shown in FIG. 5, thereby preventing the reflection light H2 from mixing with the irradiation light H3.

FIGS. 7A and 7B are diagrams showing the flatness of the transmittance of the ND filter 24, wherein FIG. 7A shows the transmittance flatness of a reference construction shown in FIG. 6, and FIG. 7B shows the transmittance flatness of the construction of this embodiment. The transmittance flatness shows the relative values of the transmittance of other wavelength bands which are measured on the basis of the transmittance of light having a wavelength of 500 nm near to the ultraviolet band.

In FIGS. 7A and 7B, a line "a" represents the transmittance flatness (relative device actual measurement value) of the ND filter 24 which is determined by dividing the spectral characteristic (device actual measurement value) of the irradiation light H3 measured under use of the ND filter 24 by the spectral characteristic (device actual measurement value) of the irradiation light H3 measured under no use of the ND filter 24, and a line "b" represents the transmittance flatness (solo actual measurement value) obtained from the transmittance spectral characteristic of the ND filter 24 shown in FIG. 3.

In the case of the reference construction shown in FIG. 6, as indicated by the line a of FIG. 7A, the ND filter 24 behaves due to the effect of the reflection light H2 described above as if the transmittance of the ND filter 24 apparently increases in a broad range of the infrared band (as indicated by an arrow C in FIG. 7A), so that the irradiation light H3 contains the infrared light component whose amount is larger than the design value.

On the other hand, in the case of the construction of this embodiment, as indicated by the line a of FIG. 7B, the mixture of the reflection light H2 with the irradiation light H3 is prevented, and thus the transmittance of the ND filter 24 is prevented from apparently increasing in the broad range of the infrared band, so that the transmittance flatness can be made substantially coincident with the solo actual measurement value indicated by the line b. In FIGS. 7A and 7B, an uneven waveform of the line b in the wavelength range from 1000 nm to about 1100 nm is estimated to be caused by measurement noises and thus it can be neglected.

Here, as the tilt (inclination) of each of the spectrum correction filter 22 and/or the ND filter 24 is larger, the reflection light H2 can be more greatly deviated from the optical axis K1. However, it is general that the transmission spectral characteristics of the spectrum correction filter 22 and the ND filter 24 frequently have incident angle dependency. Therefore, as the tilt is larger, the transmission spectral characteristics are more greatly deviated from the design values.

Therefore, in this embodiment, not one of the spectrum correction filter 22 and the ND filter 24, but both of the spectrum correction filter 22 and the ND filter 24 are tilted with respect to the optical axis K1 to greatly deviate the reflection light H2 from the optical axis K1 with suppressing the tilt angles of both the filters 22 and 24.

Specifically, as shown in FIG. 5, when the intersection angle between the normal line M1 of the spectrum correction filter 22 and the optical axis K1 is represented by α and the intersection angle between the normal line M2 of the ND filter 24 and the optical axis K1 is represented by β, (the absolute values of) the tilt angles α, β are set in the range from 5° to 30° in which the deviation of the transmission spectral characteristic caused by oblique incidence of light is small.

Each optical filter of the optical filter group 15 is disposed to be tilted with respect to the optical axis K1, whereby the travel direction of reflection light H4 returning to the light source device 12 is deviated from the optical axis K1 due to the reflection at each optical filter. Accordingly, there can be avoided such a situation that the reflection light H4 is incident to the elliptical reflection mirror 11 of the light source device 12 and converged to the neighborhood of the focal point F to cause premature electrode deterioration or the like in the lamp 10.

However, when all the optical filters (the spectrum correction filter 22 and the ND filter 24 in this embodiment) contained in the optical filter group 15 are tilted in the same direction, the deviation amount of the reflection light H2 from the optical axis K1 decreases. Therefore, as shown in FIG. 5, the tilt directions of the spectrum correction filter 22 and the ND filter 24 are opposite to each other, and both the filters 22 and 24 are arranged so as to be tilted with facing each other (i.e., substantially in inverted V-shape). That is, the tilt angles α, β of the spectrum correction filter 22 and the ND filter 24 are set to be opposite to each other in sign when the optical axis K1 is set as a standard (0°).

This arrangement makes it possible to deviate the travel direction of the reflection light H4 returning to the light source device 12 from the optical axis K1 without reducing the deviation amount of the travel direction of the reflection light H2 from the optical axis K1.

Here, the tilt angles α, β of the spectrum correction filter 22 and the ND filter 24 may be arbitrarily set to any angles at which the reflection light H2 is not mixed with the irradiation light H3, more accurately, no reflection light H2 is incident to the transmission type integrator optical system 13 to which light passing through the optical filter group 15 is incident. In addition, the tilt angles α, β are restricted to be within a small angle range in which the deviation of the transmission spectral characteristic caused by oblique incidence of light is small. Accordingly, even when the spectrum correction filter 22 and the ND filter 24 are tilted within this restricted angle range, there is a probability that the reflection light H2 is incident to the transmission type integrator optical system 13. In this case, as shown in FIG. 5, the distance L between the incidence end of the transmission type integrator optical system 13 (the incidence face of the fly-eye lens 17 in this embodiment) and the transmission type optical filter (the ND filter 24 in this embodiment) for generating the reflection light H2 directing to the transmission type integrator optical system 13 is increased, whereby the incidence of the reflection light H2 to the transmission type integrator optical system 13 is suppressed and the mixture of the reflection light H2 into the irradiation light H3 is suppressed.

As described above, according to this embodiment, the spectrum correction filter 22 and the ND filter 24 are disposed to be tilted with respect to the optical axis K1 so that the reflection light H2 reflected from the spectrum correction filter 22 is deviated from the optical axis K1, whereby the mixture of the reflection light H2 into the irradiation light H3 can be suppressed and the deviation of the spectral characteristic of the irradiation light H3 can be suppressed.

Furthermore, according to this embodiment, the spectrum correction filter 22 and the ND filter 24 is disposed to be tilted with respect to the optical axis K1 in the opposite directions to each other. By tilting both the filters 22 and 24, the reflection light H2 can be greatly deviated from the optical axis K1 with suppressing (reducing) the tilt angle of each of the filters 22 and 24. In addition, the travel direction of the reflection light H4 returning to the light source device 12 side can be deviated from the optical axis K1, and thus there can be avoided such a situation that the reflection light H4 is incident to the elliptical reflection mirror 11 of the light source device 12 and converged to the neighborhood of the focal point F to cause premature electrode deterioration or the like in the lamp 10.

In this case, the tilt directions of the spectrum correction filter 22 and the ND filter 24 are set to be opposite to each other, and arranged substantially in inverted V-shape. Therefore, the travel direction of the reflection light H4 returning to the light source device 12 side can be greatly deviated from the optical axis K1 without reducing the deviation amount of the reflection light H2 from the optical axis K1.

Furthermore, according to this embodiment, the tilt angles α, β of the spectrum correction filters 22 and the ND filter 24 with respect to the optical axis K1 are set in the angle range from 5° to 30°, more preferably in the range from not less than 10° to not more than 15° in which the variation of the transmission spectral characteristic caused by oblique liquid incidence is small. Accordingly, the deviation of the spectral characteristic of the irradiation light H3 from the design value can be suppressed.

The forgoing embodiment is an example of the present invention, and any modification and application can be made without departing from the subject matter of the present invention.

(Modification 1)

In the foregoing embodiment, the optical filter group 15 contains only one spectrum correction filter 22 and only one ND filter 24. However, the present invention is not limited to this embodiment. Two or more number of spectrum correction filters 22 and/or ND filters 24 may be provided on the same optical axis K1.

For example, as shown in FIG. 8, a spectrum correction filter 22 for attenuating the blue color component may be provided in addition to the spectrum correction filter 22 and the ND filter 24, whereby artificial (pseudo) sunlight corresponding to setting sun can be emitted as the irradiation light H3.

Furthermore, as shown in FIG. 9, one ND filter 24 may be added in addition to the spectrum correction filter 22 and the ND filter 24, whereby an adjustment of further reducing the transmittance (reduction of light amount) can be performed. When the optical filter group 15 has plural ND filters 24, the ND filters 24 are successively arranged on the optical axis K1 from the light source device 12 side in the increasing order of transmittance T1, and the distance L between the ND filter 24 having the lower transmittance T1 and the transmission type integrator optical system 13 is increased. That is, the ND filter 24 having the lowest transmittance T1 is disposed to be nearest to the light source device 12. The reason for this will be described later.

The tilt directions of the optical filters contained in the optical filter group 15 may be set to any directions insofar as the intersection angle between the normal direction of each of the incidence surface and the emission surface and the optical axis K1 is larger than 0°. At this time, as shown in FIGS. 8 and 9, some of the optical filters of the optical filter group 15 may be tilted with respect to the travel direction of the emission light H1 (i.e., the optical axis K1) while the other(s) of the optical filters of the optical filter group 15 is (are) rotated around a line Q (represented by a chain line) substantially vertical to the optical axis K1 by a predetermined angle so that the other optical filter(s) are tilted with respect to the direction perpendicular to both the line Q and the optical axis K1. That is, the directions with respect to which the respective optical filters are tilted (hereinafter referred to as "tilt directions") may be set to be different from each other. In the modification shown in FIGS. 8 and 9, the tilt directions of the optical filters 22 and 24 are set to be substantially perpendicular to each other. However, the tilt directions are not necessarily required to be substantially perpendicular to each other. That is, the line Q may be set to intersect with the optical axis K1 at an angle other than 90°.

In an optical filter group 15 having one or plural spectrum correction filters 22 and one or plural ND filters 24, an optical filter which generates reflection light H2 incident to the rear-stage optical system (the transmission type integrator optical system 13 in this embodiment) may be tilted. In this case, an optical filter which generates reflection light H2 whose light amount is too small to affect the spectral characteristic of the irradiation light H3 may not be tilted. When these optical filters are tilted, it is desirable to tilt each optical filter in an angle range in which the transmission spectral characteristic is not affected by oblique light incidence.

Furthermore, as is apparent from the formula (3), any filter which is lower in transmittance with respect to the ND filter 24 and the spectrum correction filter 22 more greatly contributes to increase of the mixing rate. Accordingly, when the optical filter group 15 contains one or plural ND filters 24 and one or plural spectrum correction filters 22, the filters 24 and 22 are successively arranged from the light source device 12 side in the increasing order of transmittance so that the distance L between the transmission integrator optical system 13 and a filter having lower transmittance is larger. That is, an optical filter having the lowest transmittance among the spectrum correction filter(s) and the neutral density filter(s) is disposed at an incidence side of the emission light from the light source, that is, disposed to be nearest to the light source. Accordingly, the mixing rate of the reflection light H2 can be efficiently suppressed with suppressing the tilt of each optical filter.

(Modification 2)

Furthermore, in the above embodiment, the ND filter 24 is disposed to be nearer to the light source device 12 than the spectrum correction filter 22. However, the present invention is not limited to this embodiment. When the spectrum correction filter 22 has such a spectral characteristic that the light in the infrared wavelength band is attenuated or cut off, the spectrum correction filter 22 may be disposed to be nearer to the light source device 12 than the ND filter 24 as shown in FIG. 10.

Describing in more detail, the ND filter 24 is generally constructed by coating metal film (chromium, Inconel or the like) on a glass substrate. However, the metal film may be oxidized by heat of light (more accurately, the glass substrate or the coating material absorbs optical energy and generates heat), so that the transmittance T2 is higher than that under an initial state.

On the other hand, the spectrum correction filter 22 is constructed by coating multilayer film of oxide such as $SiO_2$, $TiO_2$ or the like on a glass substrate. Therefore, the film on the surface of the spectrum correction filter 22 is originally formed of oxide, and thus it is hardly affected by thermal oxidation.

Therefore, when the spectrum correction filter 22 has the spectral characteristic that the light in the infrared wavelength band is attenuated or cut off, the spectrum correction filter 22 is disposed to be nearer to the light source device 12 than the ND filter 24, whereby the light in the infrared wavelength band contained in the emission light H1 of the light source device 12 can be attenuated by the spectrum correction filter 22 before it is incident to the ND filter 24. Therefore, the thermal load on the ND filter 24 can be reduced, and the transmittance T2 can be suppressed from increasing due to deterioration.

In the above embodiment and each modification, the spectrum correction filter 22 converts the emission light H1 of the light source device 12 to light having the spectral characteristic of artificial (pseudo) sunlight. However, the present invention is not limited to this style, and the spectrum correction filter 22 may convert the emission light H1 of the light source device 12 to light having any other spectral characteristic.

What is claimed is:

1. An irradiation device, comprising:
   a light source that emits light having a predetermined spectral characteristic;
   at least one spectrum correction filter that converts the predetermined spectral characteristic of the emission light emitted from the light source to a spectral characteristic of sunlight; and
   at least one neutral density filter disposed on the same optical axis as the at least one spectrum correction filter, wherein at least either the at least one spectrum correction filter or the at least one neutral density filter is tilted with respect to the optical axis so that a travel direction of reflection light reflected from the at least one spectrum correction filter and at least one neutral density filter is deviated from the optical axis.

2. The irradiation device according to claim 1, wherein the at least one spectrum correction filter and the at least one neutral density filter are tilted in opposite directions with respect to the optical axis.

3. The irradiation device according to claim 1, wherein the tilt angle of each of the at least one spectrum correction filter and the at least one neutral density filter with respect to the optical axis is set in a range from 5° to 30° so as to reduce variation of transmission spectral characteristics thereof caused by oblique light incidence.

4. The irradiation device according to claim 1, wherein the at least one spectrum correction filter and the at least one neutral density filter are successively arranged from the light source side in a transmittance increasing order so that an optical filter having lower transmittance out of the at least one spectrum correction filter and the at least one neutral density filter is nearer to the light source.

5. The irradiation device according to claim 4, wherein an optical filter having lowest transmittance among the at least one spectrum correction filter and the at least one neutral density filter is disposed at an incidence side of the emission light from the light source.

6. The irradiation device according to claim 1, wherein the at least one spectrum correction filter has a spectral characteristic of executing one of attenuation and cut-off of light in an infrared wavelength band, and is disposed to be nearer to an incidence side of the emission light from the light source than the at least one neutral density filter.

7. The irradiation device according to claim 1, wherein tilt directions of the at least one spectrum correction filter and the at least one neutral density filter are set to be different from each other.

8. The irradiation device according to claim 7, wherein the tilt directions of the at least one spectrum correction filter and the at least one neutral density filter are set to be substantially perpendicular to each other.

9. An irradiation device comprising:
a light source;
at least one spectrum correction filter that changes a spectral characteristic of emission light emitted from the light source; and
at least one neutral density filter disposed on the same optical axis as the at least one spectrum correction filter,
wherein the at least one spectrum correction filter and the at least one neutral density filter are tilted in opposite directions with respect to the optical axis while the tilt angles of the at least one spectrum correction filter and the at least one neutral density filter are variable independently of each other so that a travel direction of reflection light reflected from the at least one spectrum correction filter and at least one neutral density filter is deviated from the optical axis.

* * * * *